United States Patent [19]

Brushwyler et al.

[11] 3,845,376

[45] Oct. 29, 1974

[54] PROCESS CONTROL SYSTEM

[75] Inventors: Gordon R. Brushwyler, Yorba Linda; Richard J. Kotalik, Santa Ana, both of Calif.

[73] Assignee: Robertshaw Controls Company, Richmond, Va.

[22] Filed: Sept. 21, 1973

[21] Appl. No.: 399,536

[52] U.S. Cl. ............ 318/591, 318/609, 235/151.11, 340/147 R
[51] Int. Cl. ............................................. G05b 7/00
[58] Field of Search ........... 318/591, 590, 596, 609; 235/151.11, 151.1; 340/147 R, 147 MT

[56] References Cited
UNITED STATES PATENTS

| | | | |
|---|---|---|---|
| 3,422,457 | 1/1969 | Koppel | 318/591 |
| 3,523,193 | 8/1970 | Hutcheon | 318/591 X |
| 3,576,535 | 4/1971 | Turner | 340/147 |
| 3,694,633 | 9/1972 | Lejon | 235/151.1 |

*Primary Examiner*—B. Dobeck
*Attorney, Agent, or Firm*—Fulwider, Patton, Rieber, Lee & Utecht

[57] ABSTRACT

A process controller for controlling the operation of a particular process including an external control loop for combining an output signal from the process indicative of the operation thereof with a preselected reference signal and producing an output signal indicative of this combination. This output signal is then fed to an operational amplifier across a first two position switch which in the other position thereof open loops the input to the amplifier, connecting in an external signal source. The operational amplifier is arranged in a configuration of an integrator, including two capacitive feedback loops forming the internal loop of the controller, each feedback loop being respectively connected to the two switch positions. The capacitors in each feedback loop will therefore maintain identical initial outputs on either side of the switch, since in both instances they are referenced to a common reference, thus assuring transient-free switch over. At the output the operational amplifier is connected to control the process across a second two position switch, which, in its other position, connects the process directly to an externally powered manually controlled signal source, thus providing an alternate means for maintaining control over the process in case of power failure.

12 Claims, 3 Drawing Figures

PROCESS CONTROL SYSTEM

BACKGROUND OF THE INVENTION

1. Field of the Invention

The present invention relates to electrical process controllers, and more particularly, to process controllers which can be either operative in the automatic mode or which can be externally controlled according to a manual input.

2. Description of the Prior Art

In the automatic control disciplines, and particularly in the discipline of process controls, it is very often required that a multi-parameter process be controlled in response to one particular selected parameter. Typically such parameters are linear only over small increments, and automatic maintenance of the process referenced to parameter levels which are no longer linear is often undesirable. Such transition across non-linear sections of a parameter, usually associated with non-linear interactions with the other parameters of the process, often is accomplished by manual control. Thus it is often desirable to provide in an automatic process controller capability for switch-over to manual control, and conversely from manual control to automatic control, such switch-over to be performed without generating transient disturbances in the process. Also desirable is a second manual control mode which is essentially independent of the operation of the automatic process controller in case of controller circuitry malfunction. A further requirement of such process controllers is that they be conveniently adaptable to various process systems, allowing for flexibility in the use thereof. Particularly desirable for such applications are controllers which can be selectively varied in their response characteristics to compensate various inherent instabilities of the controlled process and to provide optimal methods of control.

SUMMARY OF THE INVENTION

Accordingly, it is the general purpose and object of the present invention to provide a process controller which is adaptable to accommodate various response coefficients of any particular process and which, at the same time, can be switched to follow a manually selected input reference signal without transients. Other objects of the invention are to provide a process control system in which the signal levels controlling the process are stored during any temporary interruption of power. A further object of this invention is to provide a process control system which includes convenient read out displays for monitoring the operations thereof.

Briefly these and other objects are accomplished in the present invention by providing a process control system generally arranged in the manner of a single parameter servo loop where the controlled parameter is summed with a reference at a deviation amplifier, and the output of the deviation amplifier corresponds to an error signal indicating the difference therebetween. This error signal is then passed to a controller amplifier which, in its feedback, includes two differentiating feedback networks, one adjustable in its gain and time domain to form an adjustable response module, and a second feedback being combined with a manual input in a manual station. An adjustable limiter circuit controls the limits of the linear range of the response module, thus controlling the linear range of the controller amplifier. The output signals of the response module and the manual station are alternatively connected to the input of the controller amplifier across a double pole - double throw switch, forming an alternative operational integrator, which, in one position, is connected to the deviation amplifier and in the other position open looped to be driven by manual control. The connection of the switch in either position also connects a zero reference to one side of the other feedback circuit. Thus, the initial signal in either manual or automatic mode consists of the charge on the respective feedback capacitors, resulting in a bumpless transfer from automatic to manual control and conversely from manual to automatic. In order to facilitate control in case of circuit failure in the controller, the output signal of the controller amplifier is connected across a two position hard manual switch which in its second position connects to a separate signal source manually adjustable to any desired level.

Other objects and features of the invention will become apparent from consideration of the following description taken in connection with the accompanying drawings.

DESCRIPTION OF THE SPECIFIC EMBODIMENT

Figure 1:
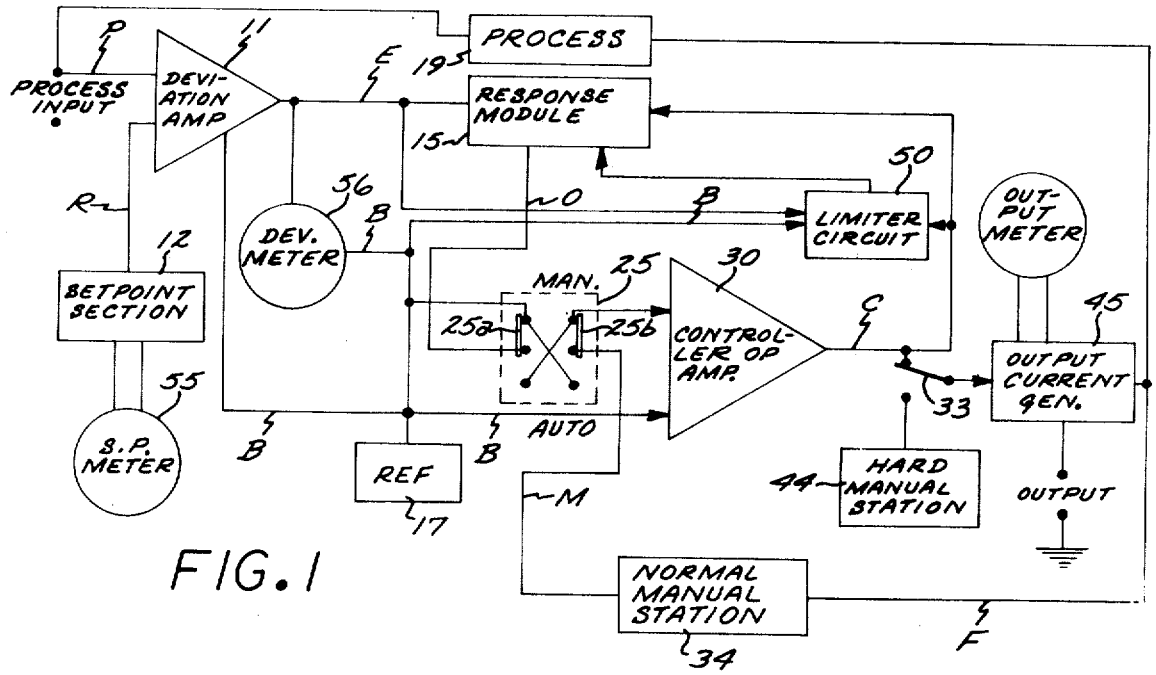
FIG. 1 is a block diagram of a process controller constructed according to the present invention.

As shown in FIG. 1, a process controller generally designated 10, comprises a deviation amplifier 11 receiving at the input a sensor signal P indicative of the operation of a particular parameter of a process 19. Also connected to the input of amplifier 11 is a manual set point selection circuit 12 for providing a reference signal R to be compared with the sensor signal P. Thus the deviation amplifier 11 forms a summing node of a servo loop which produces at the output thereof an error signal E corresponding to the difference between the process output signal P and the reference signal R. The signal E is then received in a response module 15. Response module 15 provides one feedback circuit around a controller amplifier 30, combining an output signal C from the controller amplifier 30 and the error signal E across a limiter circuit 50, to produce a combined signal O which is connected back through one set of contacts of a double pole - double throw switch 25 to the input of the amplifier 30. Signal C, at the output of amplifier 30, is further connected across one set of terminals of a two position switch 33 to an output current generator 45 and to the response module 15. The limiter circuit 50 receives the output signals and the error signal E and produces an output L to the response module 15.

The current generator 45 isolates in a conventional manner any downstream control elements of the process 19 from the operation of the process controller 10. The output signal C driving the current generator 45 also provides the feedback signal of the internal loop around amplifier 30 described above, combining with the error signal E, when switch 25 is in the position designated AUTO. In the other position, or the position designated MAN, of switch 25, the signal O from the response module 15 is being connected to a common reference, and the control input to the controller amplifier 30 is produced by the manual station 34.

Specifically, the common reference of the process controller 10 is produced in reference signal generator 17 which provides a base signal B defining a common zero reference level to deviation amplifier 11, response module 15, controller amplifier 30 and the manual station 34. As is conventionally practiced in the art, reference signal generator 17 connects to each of the above modules by parallel leads in order to reduce potential differences at various points thereof. Both the manual station 34 and response module 15 include capacitors as the circuit elements thereof which are connected on one side to the output signal C of the amplifier 30 and on the other side alternatively to the input of amplifier 30 or to the reference signal B.

Switch 25 is a double pole - double throw switch comprising two contactors 25(a) and 25(b) where contactor 25(a) alternatively connects the response module output signal O either to the reference signal B or to the input of amplifier 30 while contactor 25(b) also connects in opposing complement the output signal M from the manual station 34 to signal B or to the input of amplifier 30. Contactors 25(a) and 25(b) are ganged in a conventional arrangement of a double pole - double throw switch to operate concurrently and thereby to switch in common between the respective alternative signal connections set forth above. When placed in the position designated AUTO loop closure is made between response module 15 and the input of amplifier 30 across contactor 25(a) such that amplifier 30 receives at the input the signal O which is indicative to the combination of signals E and C. In this position contactor 25(b) provides the reference signal B to the manual station 34. In the alternative position designated MAN switch 25 connects signal O to signal B and signal M to the input of amplifier 30 such that the controller 10 is tracking signal M in an open loop mode. Switch 25, accordingly, acts to alternatively connect the signal O which comprises a combination of the feedback and the error signals to the input of amplifier 30, or to open-loop the system where the control signals controlling the process are issued from the manual station 34.

Further included in the present invention are a plurality of meter readouts including a set point meter 55 connected to register the set point selected by the set point selector 12, deviation meter 56 connected to register the error signal E, and an output meter 57 connected to register the output current of output current generator 45. These meters provide the requisite visual indication of the operation of the system.

Figure 2:
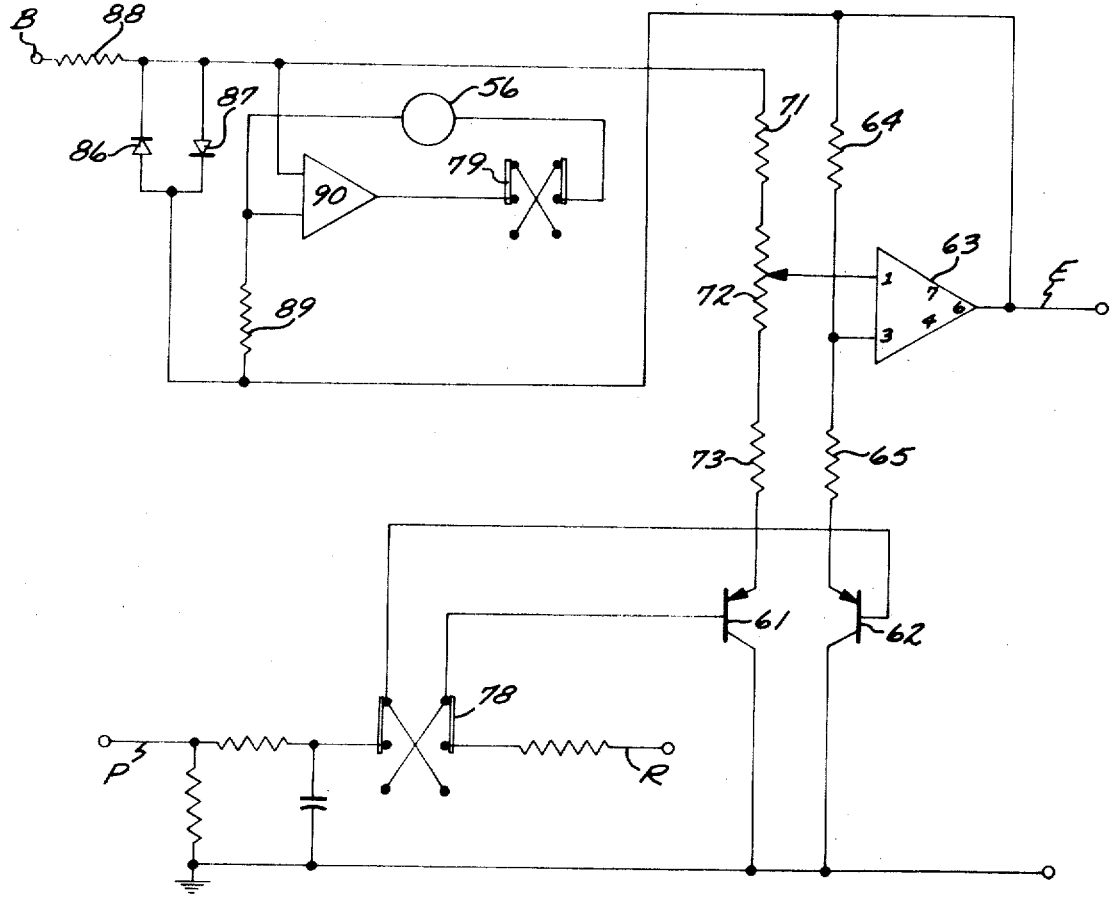
FIG. 2 is a circuit diagram of a deviation amplifier providing a summing junction of the automatic process control loop of FIG. 1.

As shown in more detail in FIG. 2, the process variable signal P and the reference input signal R respectively connect across the lower contactors 78 of a ganged reversing switch 59 within the deviation amplifier 11 to the bases of transistors 61 and 62 arranged in a configuration of a differential amplifier having the respective outputs thereof connected to the input side of a conventional high-gain, high input impedance, operational amplifier 63. The output of amplifier 63, corresponding to the error signal E, is fed back to connect to the upper end of a voltage divider comprising an upper resistor 64 in series with a lower resistor 65, where the lower end of resistor 65 connects to the emitter of transistor 62. The junction between resistors 64 and 65 is connected to one input connection of amplifier 63. A second voltage divider comprising an upper resistor 71, in series with a center potentiometer 72 and a lower resistor 73, connects between the reference signal B and the emitter of transistor 61, where the wiper of potentiometer 72 provides the other input to amplifier 63. Transistors 61 and 62 are conventionally connected in the common collector mode to the negative reference or ground, forming a differential amplifier across the input of amplifier 63. In this manner potentiometer 72 provides the nulling adjustment of the deviation amplifier 11 for conveniently adjusting amplifier 63 to produce a zero signal when P=R compensating for the normal component tolerance differential levels across transistors 61 and 62. As a further convenience for calibration and display the respective inputs to transistors 61 and 62, i.e., the base connected process variable signal P and the set point signal R, are both connected through an operational amplifier 90 and across a reversing switch formed by the upper contactors 79 of the ganged switch 59, providing the connections to a deviation meter 56. The meter 56 connects between the contactors of switch 79, across a dropping resistor 88 and a dropping resistor 89 connected in series with the deviation meter 56, having shunted thereacross a complementary diode pair 86 and 87 for Zener limiting the current passed through the deviation meter 56. The oeprational amplifier 90 provides a current to the deviation meter 56 proportional to the difference between signals B and E and independent of the meter resistance.

Figure 3:
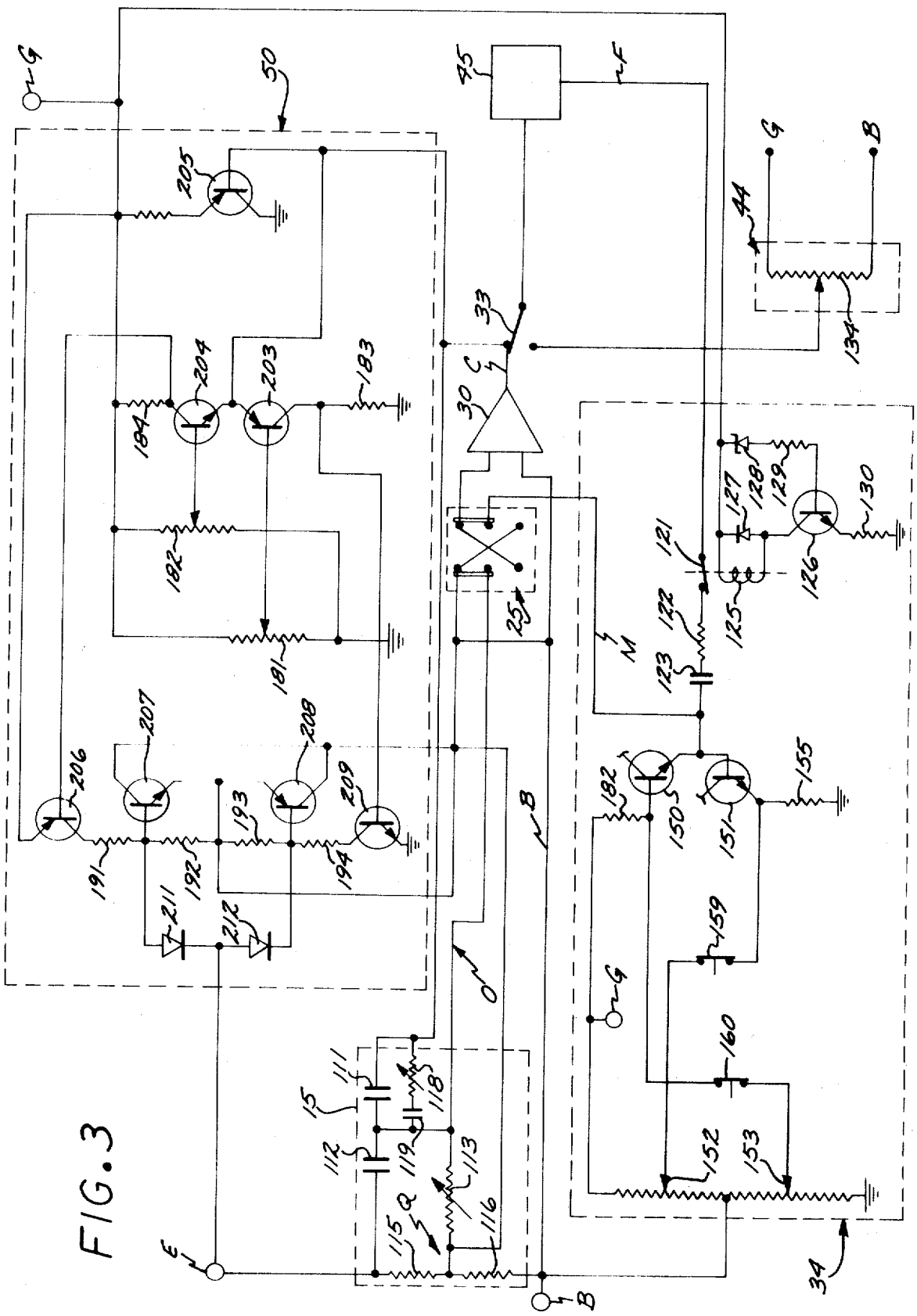
FIG. 3 is a circuit diagram of an operational amplifier network included in the forward loop of FIG. 1.

As shown in FIG. 3, the error signal E is connected to the response module 15 which at the output produces a signal O to the terminals of switch 25 to be received at the input of the controller amplifier 30. The output signal C of amplifier 30 is connected to one terminal of the two position switch 33 and to the input of the response module 15 to form one feedback circuit. The contactor of the switch 33 connects to the output current generator 45. The normal manual station 34 receives a signal F from the current generator 45 to form a second feedback circuit across a relay actuated switch 121 connected in series to one end of a resistor 122 which at the other end connects across a feedback capacitor 123 to provide signal B of station 34 to switch 25. The switch 25 in the AUTO position presents the reference voltage B to capacitor 123 through the contactor 25(a) which is the same reference voltage as presented to amplifier 30, and the capacitor is charged up to a voltage corresponding to the output signal C. In the other position of switch 25, capacitor 123 is connected to the input of amplifier 30 which also receives the reference signal B. Thus capacitor 123 alternatively connects to the reference signal B or is compared with the reference signal in amplifier 30. In this manner, a switch-over between the automatic and manual modes of switch 25 does not present transients to the process since the initial signals thereto correspond to the last signals fed back during operation in the other state.

Connected in parallel with the manual station 34 is the response module 15 comprising a first capacitor 111 shunted by a variable resistor 118 and capacitor 119 series connected to a capacitor 112 and which is shunted by a variable resistor 113 across an upper resistor 115 of a voltage divider connecting at the lower resistor 116 to signal B. Capacitor 112 also connects to the signal E, with the other end of capacitor 112 connecting to the contactor 25(a). Thus, upon reversal of switch 25 to the AUTO position the feedback around amplifier 30 is completed by the response module 15 and amplifier 30 is now presented with the combination of signals E and C and the reference signal B. According to this switch arrangement the MAN position of switch 25 connects the input to amplifier 30 to the output of the manual station 34 while the output of the response module is connected to the reference signal B.

In the manual station 34 switch 121 is pulled to a closed position by a relay winding 125 connected between a power source G and the collector of a transistor 126. Connected in parallel with winding 125 is a diode 127 and Zener diode 128 connected in series with a resistor 129 connected to the base of transistor 126. The emitter of transistor 126 connects in the fashion of a common emitter to ground in series with resistor 130. Thus when the signal G falls below the Zener voltage of diode 128 transistor 126 ceases to conduct and the switch 121 is opened. Thus an interruption of power or a drop in power below the Zener breakdown of the diode 128 will open the circuit behind capacitor 123 preventing the capacitor from discharging.

The output of capacitor 123 is also connected to a ramp generator circuit. This circuit essentially comprises a first diode connected transistor 150 connected at the emitter thereof to the capacitor 123 and to the base of a second diode connected transistor 151. Transistors 150 and 151 are functioning as diodes both being reverse biased relative the signal level at capacitor 123 by a manual switch circuit including normally closed push-to-open switches 159 and 160. The base of transistor 150 is normally reversed biased across switch 160 by a voltage divider 153 connected between signals B and ground. When the reverse biasing signal is removed from the transistor 150 by opening of switch 160 it begins to conduct imposing one input signal to the operational integrator and causing the output of amplifier 30 to ramp up. Similarly the emitter of the transistor 151 is connected to a reverse biasing level at a divider 152 between signals G and B, and again upon removal of this signal by a switch 159 causes positive current to flow therethrough. The respective ramp rates are determined by the resistance values of resistors of a base resistor 156 on transistor 150 and an emitter resistor 155 on transistor 151.

The output of amplifier 30 is connected across the hard manual switch 33 which, in case of controller failure, may be manually actuated to switch over to its second position, connecting in the hard manual station 44 to a variable potentiometer 134 disposed between signal G and ground which now provides the input to the controlled current generator 45. As described above, concurrent with any power loss switch 121 is switched open by relay 125, which is connected across diode 127 and amplified through transistor 126, such that a reduction of power below the Zener Voltage of diode 128 opens the path across capacitor 123, thereby maintaining capacitor 123 charged by opening the discharge path thereof.

Included further around controller amplifier 30 is the limiter circuit 50. Specifically the limiter circuit 50 includes two potentiometers connected as voltage dividers 181 and 182 in parallel between the reference signal B and the power supply source G. The respective wipers of dividers 181 and 182 connect to the base terminals of corresponding complementary PNP-NPN transistors 203 and 204. Transistor 203 and 204 are connected emitter-to-emitter, between corresponding collector resistors 183 and 184 across signal G to ground. The respective collector signals of transistors 203 and 204 are then connected to the bases of complementary NPN-PNP transistors 206 and 209 which, at the corresponding emitters thereof, also respectively connect between source G and ground. The collectors of transistors 206 and 209 are connected by a resistor series comprising resistors 191, 192, 193 and 194. The common connection between resistors 193 and 192 is also connected to the reference signal B and to the emitters of complementary PNP-NPN transistors 207 and 208 where the respective junctions between resistors 191 and 192, and 193 and 194 provide the respective base signals to these transistors. The collectors of transistors 207 and 208 are then received in common at the junction of 115 and 116 while the bases thereof are further connected across corresponding diodes 211 and 212 to be combined with signal E. The output signal C of amplifier 30 is then connected to the emitters of transistors 203 and 204 and to the base of a transistor 205 which is emitter connected across a resistor 165 to the source G.

Thus, the signal C renders transistors 203 and 204 selectively conductive upon exceeding the wiper voltage of divider 181 to turn the transistor 203 on, or by falling below the level set by divider 182 to turn transistor 204 on. The collector signal of transistor 203 then turns on transistors 208 and 209 and the collector signal of transistor 204 turns on transistors 206 and 207. The collectors of transistors 207 and 208 are directly connected to signal Q reducing signal Q to the level of signal B when either is conducting to limit further charging of capacitor 111. Diodes 211 and 212, respectively, further couple the conduction of transistors 207 and 208 to the polarity of signal E referenced against signal B.

The operation of the present invention will now be set forth with reference to FIGS. 1 and 2 and with particular reference to FIG. 3. Specifically the process controller comprises the forward loop of a linear servo controller having a summing junction formed by the deviation amplifier 11. This summing junction receives the output measurement of a particular parameter converted to an electrical signal P and a steady state control reference signal R which constitutes the command signal to the control system. The combination of signals P and R is converted to an error signal E and is combined with reference B at a second summing node in the response module 15. When the process controller is operating in the automatic mode the response module 15 constitutes one feedback path around the control amplifier 30, being limited by limiter circuit 50 to clamp the maximum and minimum amplitudes of the signal output C of the amplifier 30 and prevent charging of capacitor 111. A second feedback signal formed by manual station 34 is connected in this mode to a reference signal B, both feedback signals constituting integrals of the signal C as produced by capacitors where the respective feedback capacitors are switched in together with their respective inputs. Station 34 includes switching circuitry in order to provide an open-loop input which drives amplifier 30 to ramp the output of the system up or down according to a desired direction. The selection between the first feedback route, i.e., the feedback route combining in the response module signal C with the error signal E, and the feedback route including the normal manual station 34, is provided by a two-position double pole switch 25. The output of amplifier 30 is further switched across a switch 33 to a hard manual station which is independent of the operation of the rest of the system. Thus the controller amplifier 30 can be by-passed in case of failure by a direct manual input to the hard manual station which operates the process in an open loop fashion.

It is to be noted that switch 25 includes contactors 25(a) and 25(b) which respectively connect either the output of response module 15 or the output of the normal manual station 34 to the refernece voltage B while connecting the opposite one to the input of controller amplifier 30. Thus the response module or the normal manual station is always referenced against a signal which is the same signal providing the zero reference for the whole system. Amplifier 30 is thus hooked up in either a closed loop fashion to signal E, operating the loop as a servo, or in an open loop fashion to the normal station 34 to be alternatively ramped up or down according to the desired direction of operation. Further included in the manual station is a circuit breaker comprising switch 121 and relay 125 which are controlled by a transistor amplifier including a transistor 126 gated to inactivate the relay when the voltage of the source G or the input voltage falls below a predetermined voltage level controlled by a Zener diode 128. The switch is placed on the return side of capacitor 123 thus insuring, in case of temporary power failure, that a charge will be maintained on the capacitor to resume operation of the system when power is brought back in.

Some of the many advantages of the present invention should now be readily apparent. The system allows for a dual manner of controlling, one being directly responsive to the deviations from a preselected reference, and the other being responsive to manual inputs according to an open loop fashion. The switch over between the alternate manner of control is maintained bumpless by the arrangement of interconnections across a two-position switch. The system further allows for a separate control input, also open loop, which is independent from the operation of the controller amplifier, thus allowing for maintenance of control over the process even in cases of circuit failure in the control system.

Obviously many modifications and variations may be made with regard to the foregoing detailed description without departing from the spirit of the invention.

The embodiments of the invention in which an exclusive property or privilege is claimed are defined as follows:

1. Apparatus for controlling a process according to means responsive to the operational state of the process producing a process variable output signal indicative thereof, comprising:

a source for producing a common zero reference signal;

an operational integrator connected to receive at the input thereof said reference signal, including a first capacitive feedback and a second capacitive feedback, for producing an output signal corresponding to an integral of the signals received at the input thereof;

combining means adapted to receive the process variable signal and a control input signal for producing an output signal indicative of a linear combination thereof connected to said first capacitive feedback;

first input generating means connected to said second capacitive feedback for producing a signal of preselected amplitude and polarity;

first switching means disposed to alternatively connect said first or second capacitive feedback to the input of said operational integrator and connecting respectively the other alternative ones thereof to said reference signal;

second input generating means for producing a manually variable output signal electrically independent of said operational integrator;

second switching means interposed across the output of said operational integrator to alternatively connect to pass said second input generating means or said operational integrator means output signals;

isolation means connected to receive said second switching means output signal for producing an output signal; and limiting means operatively connected across said first capacitive feedback for terminating the integral input to said operational integrator upon sensing a signal from said first capacitive feedback above a predetermined amplitude.

2. Apparatus according to claim 1, further comprising:

said second capacitive means further including relay means disposed in series at the input side thereof and adapted to be responsive to the signal level of a power supply, for opening the input signal path when said power supply signal is below a preselected level; and said limiting including circuit elements connected between the output of said first capacitive feedback and the input of said operational integrator for referencing said output and input to said common zero reference signal.

3. Apparatus according to claim 2 wherein:

said input generating means including third switching means for selectively providing signals of preselected amplitude to said second capacitive feedback.

4. Apparatus according to claim 3 wherein:

said limiting means including complementary transistor means connected at the emitters thereof to said integrator output signal and adapted to receive preselected base signals to be selectively rendered conductive when said integrator output signal is above or below corresponding ones of said base signals, and switching transistor means connected to be rendered conductive by the collector signals of said complementary transistor means for conducting to connect the output of said first capacitive feedback and the input to said integrator to said zero reference signal.

5. Apparatus according to claim 4, further comprising:

first meter readout means respectively connected to said combining means for producing a visual display indicative of the output signal thereof;

second meter readout means operatively connected to the output of said isolating means for producing a visual display indicative thereof; and third meter readout means connected to the input of said combining means for producing a visual display corresponding to the received control signal thereat.

6. Apparatus for controlling a process, comprising:

a process responsive to a process control signal and producing a process variable output signal indicative of the operation thereof;

signal combining means connected to receive said process variable signal for combining said process variable signal with a manually adjustable process input signal and producing an error signal indicative of the combination thereof;

first switching means connected to receive said error signal at a first terminal thereof including a contactor terminating at a second terminal and disposed to switch between the first and a third terminal;

amplifying means connected to a second terminal of said switching means for amplifying the signal thereat;

first capacitive feedback means connected between the output of said amplifying means and said first terminal of said first switching means for feeding back a first feedback signal indicative of a differential of said amplifying means output signal;

second capacitive feedback means connected between the output of said amplifying means and the third terminal of said switching means for feeding back a second feedback signal indicative of a differential of said amplifying means output signal;

first input generating means connected to said second capacitive feedback for producing a signal of preselected amplitude and polarity;

second switching means connected to operate concurrent with said first switching means interposed between said amplifying means and said first and second capacitive feedback means for alternatively connecting selected other ones thereof to said amplifying means or to a zero reference signal;

signal isolation means connected to receive the output signal of said second switching means for producing said process control signal indicative thereof; and limiting means operatively connected across said first capacitive feedback for terminating the integral input to said operational integrator upon sensing a signal from said first capacitive feedback above a predetermined amplitude.

7. Apparatus according to claim 6, wherein:

said first capacitive feedback means including variable resistor means for adjustment of the gain and frequency response thereof.

8. Apparatus according to claim 7, wherein:

said signal combining means includes a differential amplifier connected to respectively receive said process variable signal and said process input signal for producing an output signal indicative of the difference therebetween.

9. Apparatus according to claim 8 further including:

visual displays indicative of said error signal, said process input signal and said process control signal.

10. Apparatus according to claim 6 wherein:

said second capacitive means further including relay means disposed at the input side thereof adapted to be responsive to the signal level of a power supply for opening the input signal path when said power supply signal is below a preselected level; and said limiting including circuit elements connected between the output of said first capacitive feedback and the input of said operational integrator for referencing said output and input to said common zero reference signal.

11. Apparatus according to claim 10, wherein:

said input generating means including third switching means for selectively providing signals of preselected amplitude to said second capacitive feedback.

12. Apparatus according to claim 11, wherein:

said limiting means including complementary transistor means connected at the emitters thereof to said integrator output signal and adapted to receive preselected base signals to be selectively rendered conductive when said integrator output signal is above or below corresponding ones of said base signals, and switching transistor means connected to be rendered conductive by the collector signals of said complementary transistor means for conducting to connect the output of said first capacitive feedback and the input to said integrator to said zero reference signal.

* * * * *